May 21, 1935.  G. D. BANTA  2,002,284
OSCILLATORY CONNECTION
Filed Jan. 25, 1934
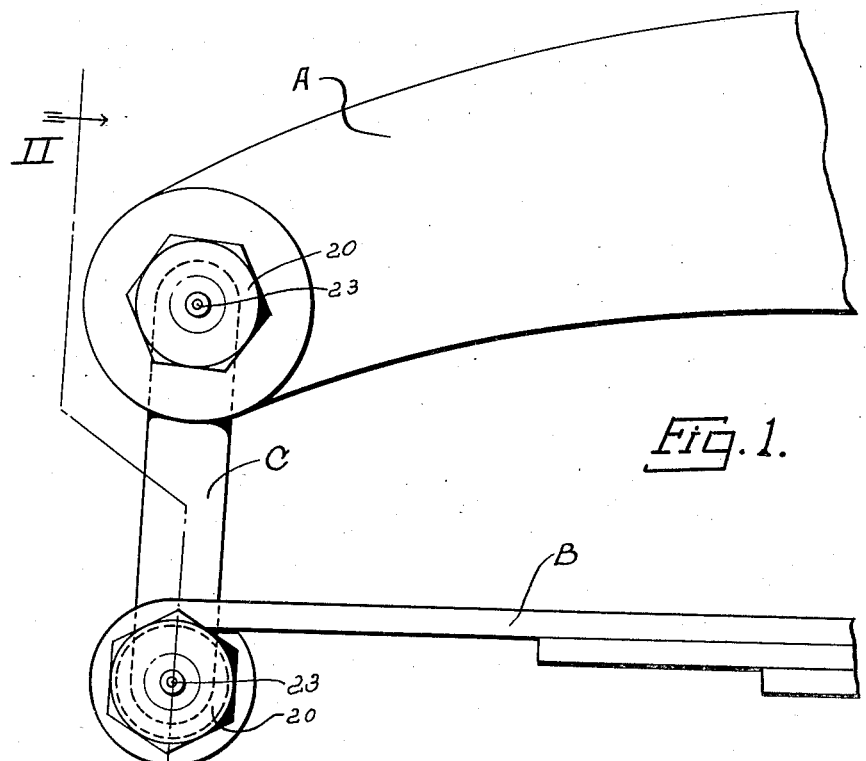
Fig.1.
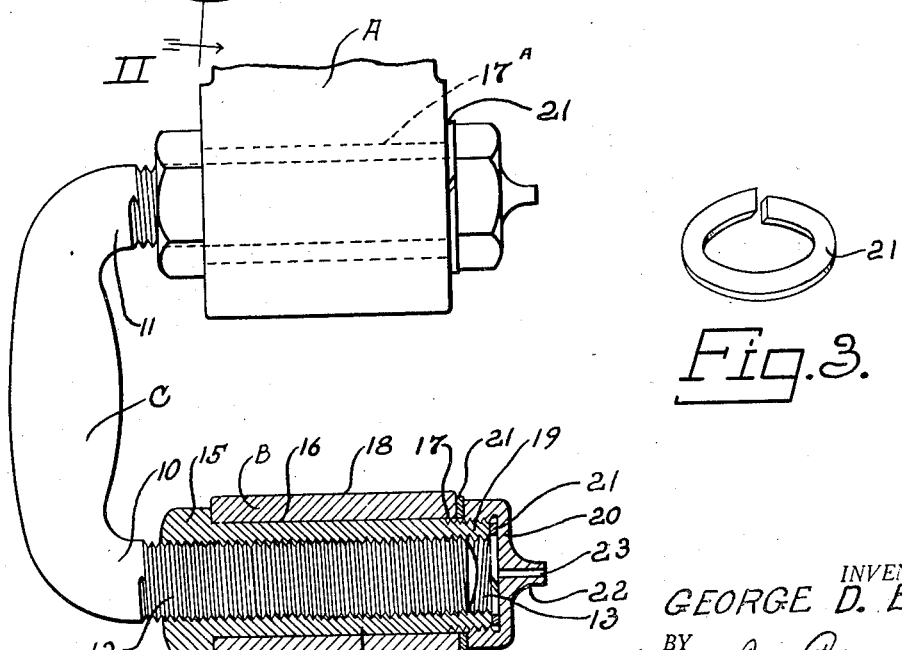
Fig.3.
Fig.2.
INVENTOR.
GEORGE D. BANTA.
BY
ATTORNEYS.

Patented May 21, 1935

2,002,284

UNITED STATES PATENT OFFICE 2,002,284

OSCILLATORY CONNECTION

George D. Banta, Ypsilanti, Mich., assignor to Chrysler Corporation, Detroit, Mich., a corporation of Delaware Application January 25, 1934, Serial No. 708,199

4 Claims. (Cl. 267—54)

This invention, in its broader aspects, relates to joints of the oscillatory type and refers more particularly to improvements in motor vehicle spring shackles, hangers, or the like.

My invention has particular significance in providing improvements in the so-called threaded types of spring shackles, although it is not necessarily limited to such types in the broader aspects thereof.

Many difficulties have been experienced heretofore in the use of threaded type spring shackles. Thus, the bushing ordinarily used has a tendency under the normal movement of the shackle to thread itself out of the assembly, resulting in damage to the shackle and, in certain instances, resulting in failure of the spring suspension. It is generally desirable to supply lubricant under pressure to the threaded connection and difficulties have resulted, prior to my invention, in the lubricant pressure forcing the bushing closure from the assembly, especially when pressure is applied somewhat in excess of the normal lubricant pressure.

It is an object of my invention to provide an improved joint of the character referred to, which will effectively and efficiently overcome the aforesaid difficulties.

A further object is to provide a spring shackle of the threaded type which will not work loose or result in spring suspension failures, and which will not fail under application of pressure lubrication even when such pressure is abnormal.

Still further objects reside in providing an improved shackle which may be assembled with its component parts prior to installation into the usual spring eye, spring hanger, or other part receiving the assembly, thereby facilitating the assembly work and reducing the cost thereof; also in providing for a threaded working connection within the bushing where expansion of the spring eye or like part will not adversely affect the threads.

Other objects reside in the provision of a generally improved oscillatory joint of simple construction and which may be manufactured and assembled at relatively low cost.

Additional objects and advantages of my invention reside in the novel combination and arrangement of parts more particularly hereinafter described and claimed, reference being had to the accompanying drawing illustrating one embodiment thereof, and in which:

Fig. 1 is a side elevational view of my improved shackle assembly.

Fig. 2 is an end elevational view hereof, partly in cross section, along the line II—II of Fig. 1.

Fig. 3 is a detail view of the spring washer for the assembly.

In the drawing, reference character A represents the spring hanger or like member of the motor vehicle, B the usual spring member associated therewith, and C is shackle herein illustrated as the U form. Since the oscillatory joint or connection between arms or shafts 10 and 11 of shackle C and the spring B or hanger A may be similar, the description of the details of such connection will, for convenience, be limited to the parts associated with the arm 10 and illustrated in cross section in Fig. 2.

Arm 10 is preferably threaded at 12 for engagement with threads 13 formed in the axial opening of bushing 14. This bushing has an outwardly projecting annular shoulder 15 at the shackle end thereof and a cylindrical portion 16 receiving the cylindrical opening 17 of the spring eye 18, or receiving the opening 17a in the case of the hanger A.

Bushing 14 preferably has an exteriorly threaded end 19 projecting beyond the spring eye for threadedly receiving the nut or closure member 20, a spring washer 21 of any suitable type being interposed either between bushing 14 and nut 20, or between spring eye 18 and nut 20, or both places as illustrated in Fig. 2.

The nut 20 has an oiler tip 22 formed or connected therewith, the passage 23 being adapted to conduct lubricant under pressure from a suitable source of supply to the working threads 12 and 13.

By reason of my improvements, the shackle C may be assembled with bushings 14 for the respective arms 11 and 12, prior to attachment to the hanger A and spring B. On assembly of such parts, bushings 14 preferably have either a pressed or close fit with openings 17 and 17a so as to occupy the position illustrated. Nuts 20 are then assembled, with washers 21 interposed, these nuts respectively forcing the shackle assembly to the right, as viewed in Fig. 2, so that shoulders 15 are brought tightly against the sides of the spring eye 18 or hanger A, the latter members being thereby clamped against movement relative to the associated bushings 14, assisted somewhat by the aforesaid fit of these bushings. It will thus be observed that the desired oscillatory movement will be confined to the lubricated joint provided by threads 12 and 13.

In the event that excessive pressure of lubricant is applied to the connection through passage 23, no damage can result, nut 20 being securely held against displacement.

Various changes in the details of construction and arrangement of parts which I have described and illustrated will be apparent from the teachings of my invention and I do not limit my invention to such details.

What I claim is:

1. In a device of the character described, a member having an opening, a bushing fitting within said opening and having a shoulder at one end thereof engaging said member, said bushing having an exteriorly threaded portion at the other end thereof and being provided with an opening extending within the opening of said member, a shaft threadedly fitting within said bushing opening, and a nut engaging said threaded bushing portion and forcing said member against said shoulder, and means carried by said nut for passing lubricant to the threads of said shaft and bushing opening.

2. In a spring and shackle connection, a bushing provided with a shoulder at one end thereof and having a threaded opening extending longitudinally therethrough, a substantially U-shaped shackle having a threaded arm extending within the opening of said bushing and fitting the threads thereof for relative oscillatory movement therewith, said spring having a portion surrounding said bushing, the other end of said bushing having a threaded portion extending beyond said spring portion, and a member threaded to said extending portion of the bushing and acting to hold said spring portion against said bushing shoulder.

3. In a spring and shackle connection, a bushing provided with a shoulder at one end thereof and having a threaded opening extending longitudinally therethrough, a substantially U-shaped shackle having a threaded arm extending within the opening of said bushing and fitting the threads thereof for relative oscillatory movement therewith, said spring having a portion surrounding said bushing, the other end of said bushing having a threaded portion extending beyond said spring portion, and a member threaded to said extending portion of the bushing and acting to hold said spring portion against said bushing shoulder, said member substantially enclosing the last said end of the bushing.

4. In a spring and shackle connection, a bushing provided with a shoulder at one end thereof and having a threaded opening extending longitudinally therethrough, a substantially U-shaped shackle having a threaded arm extending within the opening of said bushing and fitting the threads thereof for relative oscillatory movement therewith, said spring having a portion surrounding said bushing, the other end of said bushing having a threaded portion extending beyond said spring portion and beyond a terminal end of said threaded arm, and a member threaded to said extending portion of the bushing and acting to hold said spring portion against said bushing shoulder, said member extending across said terminal end of said threaded arm and substantially enclosing the last said end of the bushing, said member having an opening therethrough for conducting lubricant under pressure to the threaded opening of said bushing.

GEORGE D. BANTA.